United States Patent
Zhao

(10) Patent No.: US 10,237,776 B2
(45) Date of Patent: Mar. 19, 2019

(54) METHOD FOR CONTROLLING TRANSMISSION RATE AND WLAN DEVICE USING THE SAME

(71) Applicant: Sercomm Corporation, Taipei (TW)

(72) Inventor: Shao-Hai Zhao, Jiangsu Province (CN)

(73) Assignee: SERCOMM CORPORATION, Taipei (TW)

( * ) Notice: Subject to any disclaimer, the term of this patent is extended or adjusted under 35 U.S.C. 154(b) by 53 days.

(21) Appl. No.: 15/401,161

(22) Filed: Jan. 9, 2017

(65) Prior Publication Data
US 2017/0201901 A1 Jul. 13, 2017

(30) Foreign Application Priority Data

Jan. 13, 2016 (CN) .......................... 2016 1 0021206

(51) Int. Cl.
*H04L 29/06* (2006.01)
*H04W 28/02* (2009.01)
*H04L 12/825* (2013.01)
*H04W 84/12* (2009.01)

(52) U.S. Cl.
CPC ............. *H04W 28/02* (2013.01); *H04L 47/25* (2013.01); *H04W 84/12* (2013.01)

(58) Field of Classification Search
CPC ..... H04L 41/5009; H04L 65/80; H04L 67/12; H04L 29/06; H04L 41/0213; H04L 41/083; H04L 41/0896; H04L 43/0829; H04L 67/327; H04L 69/16; H04L 47/10; H04L 12/1868; H04L 27/0008; H04L 45/302; H04L 45/741; H04L 1/0026
See application file for complete search history.

(56) References Cited

U.S. PATENT DOCUMENTS

| 7,146,174 B2* | 12/2006 | Gardner ................. G10L 19/22 455/453 |
| 7,369,510 B1 | 5/2008 | Wong et al. |
| 8,238,253 B2* | 8/2012 | Morrill ............... H04L 41/5009 370/216 |
| 8,547,841 B2 | 10/2013 | Hamdi |
| 9,015,318 B1* | 4/2015 | Batz .................... H04L 61/1511 709/217 |

(Continued)

FOREIGN PATENT DOCUMENTS

| CN | 1361962 A | 7/2002 |
| CN | 101010900 A | 8/2007 |

(Continued)

OTHER PUBLICATIONS

CN Office Action dated May 3, 2018 in corresponding Chinese application (No. 201610021206.1).

*Primary Examiner* — Sai Aung
(74) *Attorney, Agent, or Firm* — McClure, Qualey & Rodack, LLP

(57) ABSTRACT

A method for controlling transmission rate and a wireless local area network (WLAN) device are provided. The method for controlling transmission rate includes the following steps. Calculate a bandwidth requirement of the WLAN device according to a network application service provided by the WLAN device in an application layer. Determine a WLAN data transmission rate of the WLAN device in a physical layer according to the bandwidth requirement.

10 Claims, 2 Drawing Sheets

(56) References Cited

U.S. PATENT DOCUMENTS

| | | |
|---|---|---|
| 9,071,628 B2 | 6/2015 | Milburn et al. |
| 9,130,705 B2 | 9/2015 | Hansen |
| 9,137,753 B2 | 9/2015 | Li et al. |
| 2002/0133589 A1 | 9/2002 | Gubbi et al. |
| 2003/0235209 A1* | 12/2003 | Garg .................. H04L 12/4675 370/468 |
| 2005/0053005 A1* | 3/2005 | Cain .................... H04L 45/123 370/235 |
| 2007/0280245 A1* | 12/2007 | Rosberg ................ H04L 47/10 370/392 |
| 2011/0058523 A1* | 3/2011 | Manning .............. H04W 28/16 370/329 |
| 2013/0039212 A1 | 2/2013 | Li et al. |
| 2013/0132562 A1* | 5/2013 | Bandyopadhyay ......................... H04L 41/0896 709/224 |
| 2013/0165119 A1 | 6/2013 | Lee |
| 2014/0293790 A1 | 10/2014 | Xiao et al. |
| 2015/0295836 A1 | 10/2015 | Welin et al. |

FOREIGN PATENT DOCUMENTS

| | | |
|---|---|---|
| CN | 102932895 A | 2/2013 |
| WO | 2006024993 A1 | 3/2006 |

\* cited by examiner

METHOD FOR CONTROLLING TRANSMISSION RATE AND WLAN DEVICE USING THE SAME

CROSS-REFERENCE TO RELATED APPLICATION

This application claims the benefit of People's Republic of China application Serial No. 201610021206.1, filed on Jan. 13, 2016, the subject matter of which is incorporated herein by reference.

TECHNICAL FIELD

The disclosure relates in general to a method for controlling transmission rate and a wireless local area network (WLAN) device, and more particularly to a transmission rate control method that effectively saves the resource consumed by the device.

BACKGROUND

As technology advances, many electronic devices may use wireless communication technology for data transmission. These electronic devices include laptop computers, flat panel computers, cellphones, Internet Protocol (IP) cameras, and so on. In a home environment and in an office environment, wireless local area network (WLAN) is a wireless communication technology widely used in these electronic devices. It is currently one of the issues in the industry regarding how to control the data transmission rate of a WLAN device.

SUMMARY

The disclosure relates to a method for controlling transmission rate and a WLAN device using the same. One of the purposes of this invention is to make the WLAN device save the resources consumed by itself and perform data transmission in an optimized and efficient manner.

According to one embodiment, a method for controlling transmission rate is provided. The method is used in a WLAN device. The method includes the following steps. Calculate a bandwidth requirement of the WLAN device according to a network application service provided by the WLAN device in an application layer. Determine a WLAN data transmission rate of the WLAN device in a physical layer according to the bandwidth requirement.

According to another embodiment, a WLAN device is provided. The WLAN device includes a transmission unit and a processing unit. The transmission unit is configured to transmit WLAN data with a WLAN data transmission rate. The processing unit is configured to calculate a bandwidth requirement of the WLAN device according to a network application service provided by the WLAN device in an application layer, and to determine the WLAN data transmission rate of the WLAN device in a physical layer according to the bandwidth requirement.

Figure 1:
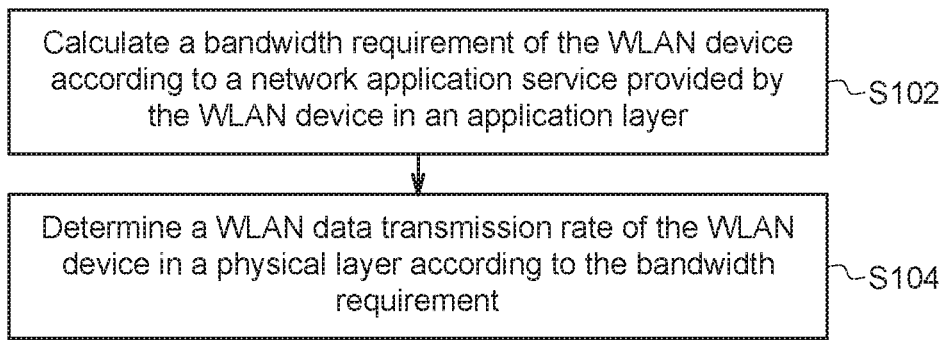
FIG. 1 shows a flowchart illustrating a method for controlling transmission rate according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

IEEE 802.11 is a standard for wireless network communication defined by the Institute of Electrical and Electronics Engineers (IEEE), and is a universal standard for WLAN today. The IEEE 802.11 standard provides multiple available data transmission rates to be chosen. In a wireless network environment, communication channel state may affect the maximum data transmission rate that can be used. The IEEE 802.11 standard includes 802.11a, 802.11b, 802.11g, 802.11n, 802.11ac, etc. For example, the available data transmission rates of the IEEE 802.11a standard include 6 Mbps, 9 Mbps, 12 Mbps, 18 Mbps, 24 Mbps, 36 Mbps, 48 Mbps, 54 Mbps depending on the channel state. The available data transmission rates of the IEEE 802.11b standard include 1 Mbps, 2 Mbps, 5.5 Mbps, and 11 Mbps. The IEEE 802.11n and IEEE 802.11ac standard may provide even higher data transmission rate.

In a WLAN environment, the signal quality may be dynamically affected by several conditions, such as obstacles (including wall, door, floor, etc.) near the transmitter or the receiver, path fading related to transmission distance, multiple path transmission, or interference caused by other signal sources. These dynamic conditions may result in error rate in wireless signal transmission. The error rate is likely to become higher when the data transmission rate is higher. Therefore, higher data transmission rate is suitable for nearly ideal channels, such as a channel having short transmission distance. On the other hand, lower data transmission rate usually possesses more reliable transmission quality and has stronger ability to overcome the environmental obstacles, making it suitable for a noisy channel or a channel having long transmission distance.

A WLAN device may adjust data transmission rate according to the physical layer environment, such as based on the number of successful transmissions and failures in the past, or based on the measured signal quality. For example, higher transmission rate may be used when the transmission distance is short, and lower transmission rate may be used when the transmission distance is long. Another approach for adjusting data transmission rate is: decreasing the transmission rate when the data error rate exceeds a threshold value, and increasing the transmission rate when the data error rate is lower than the threshold value.

However, by adjusting the WLAN data transmission rate (abbreviated as TxRate in the following description) with a specific algorithm in the lower network layer according to physical layer parameters as the methods described above, it may cause the TxRate of the WLAN device to be unstable. For example, continuous fluctuation in the TxRate may lead to unnecessary resource waste. Further, when the WLAN device determines TxRate according to the physical layer environment, it tries from the highest possible TxRate. Take the IEEE 802.11a standard for example, TxRate of 54 Mbps is tried first. If the data transmission fails, the TxRate will drop by one level to 48 Mbps. The decrease in the TxRate continues until a TxRate that results in successful data transmission is found. Such repeated try and error procedure may lead to unnecessary waste in time and resource.

FIG. 1 shows a flowchart illustrating a method for controlling transmission rate according to an embodiment of the disclosure. This method may be used in a WLAN device 20. The WLAN device 20 is for example an IP camera, a network video recorder (NVR), or a device having a WLAN communication interface. The method for controlling transmission rate includes the following steps. Step S102: calculate a bandwidth requirement of the WLAN device according to a network application service provided by the WLAN device in an application layer. Step S104: determine a WLAN data transmission rate (TxRate) of the WLAN device in a physical layer according to the bandwidth requirement.

Figure 2:
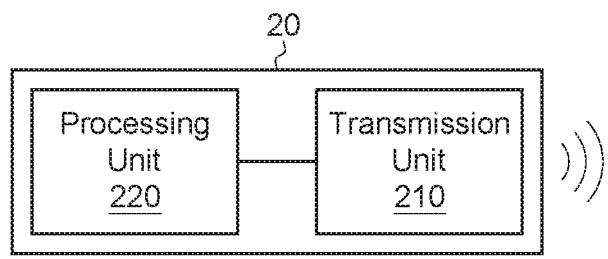
FIG. 2 shows a WLAN device according to an embodiment of the invention.

FIG. 2 shows a WLAN device according to an embodiment of the disclosure. The WLAN device 20 includes a transmission unit 210 and a processing unit 220. The transmission unit 210 is configured to transmit WLAN data with a WLAN data transmission rate (TxRate). The processing unit 220 is configured to calculate a bandwidth requirement of the WLAN device 20 according to a network application service provided by the WLAN device 20 in an application layer, and to determine the WLAN data transmission rate (TxRate) of the WLAN device 20 in a physical layer according to the bandwidth requirement. The transmission unit 210 may be a WLAN interface circuit, such as wireless radio frequency circuit for transmitting WLAN signals. The processing unit 220 may be a processor circuit, configured to perform the steps shown in FIG. 1. For example, the method shown in FIG. 1 may be implemented by software or firmware, which may be stored in the WLAN device 20 and loaded by the processing unit 220 to execute the steps shown in FIG. 1.

According to the method for controlling transmission rate and the WLAN device using the same, because the bandwidth requirement needed by the network application service provided by the WLAN device 20 is taken into consideration, the TxRate of the WLAN device 20 can be quickly set to a value that conforms to the bandwidth requirement, effectively reducing time for trying different TxRate values. In addition, the TxRate can be maintained stable, preventing an unstable state where TxRate is adjusted continuously. Moreover, since the TxRate is adjusted according to the bandwidth requirement of the actual application of the WLAN device 20, high error rates and additional resource consumption caused by TxRate having an excessively high value can be avoided. The TxRate can be set directly in accordance with the bandwidth currently required by the WLAN device 20.

An example is given below for illustrating the disclosed method. The WLAN device 20 in this example is an IP camera that monitors the environment near the home and provides a monitoring video to the home user. The WLAN device 20 may provide a streaming service such that the user may watch a streaming video. For the WLAN device 20 in this example, the step S102 may include the following steps: obtaining a current streaming configuration of the streaming service, and determining the bandwidth requirement according to the current streaming configuration. The streaming configuration corresponds, for example, to how many users are currently sending a streaming request to the WLAN device 20.

For example, the WLAN device 20 may simultaneously support four-way streaming services. The bandwidth for each stream may be set as 8 Mbps. When there are two users requesting streaming simultaneously, the bandwidth requirement calculated in the step S102 is 16 Mbps. As such, the TxRate of the WLAN device 20 may be set as greater than 16 Mbps. There is no need for setting a TxRate that is overly large, and thus additional resource waste can be avoided. Taking the IEEE 802.11a standard for example, the TxRate may be set as 18 Mpbs under the current condition. Such setting has the advantages of fast settling time (reducing try and error time starting from the highest level), user successful operation guaranteed (the TxRate meets the bandwidth requirement of 16 Mbps), and system stability maintained (not using TxRate with too large values, and thus error rate and resource consumption are reduced). It should be noted that the TxRate used in the IEEE 802.11a standard is merely exemplary here rather than limiting the invention as the TxRate defined by future IEEE 802.11 standards may possibly become faster or slower.

The bandwidth requirement of the WLAN device 20 calculated in the step S102 may be a sum of bandwidth requirements considering multiple applications of the WLAN device 20 in the application layer. For example, in addition to providing streaming video, the WLAN device 20 may also need to upload video to a video server. The bandwidth requirement for the upload application may be calculated according to the recorded video file's size and upload time. The WLAN device 20 may also receive commands from other devices at the same time. The individual bandwidth requirement of each application may be summed up to obtain the bandwidth requirement of the WLAN device 20.

Figure 3:
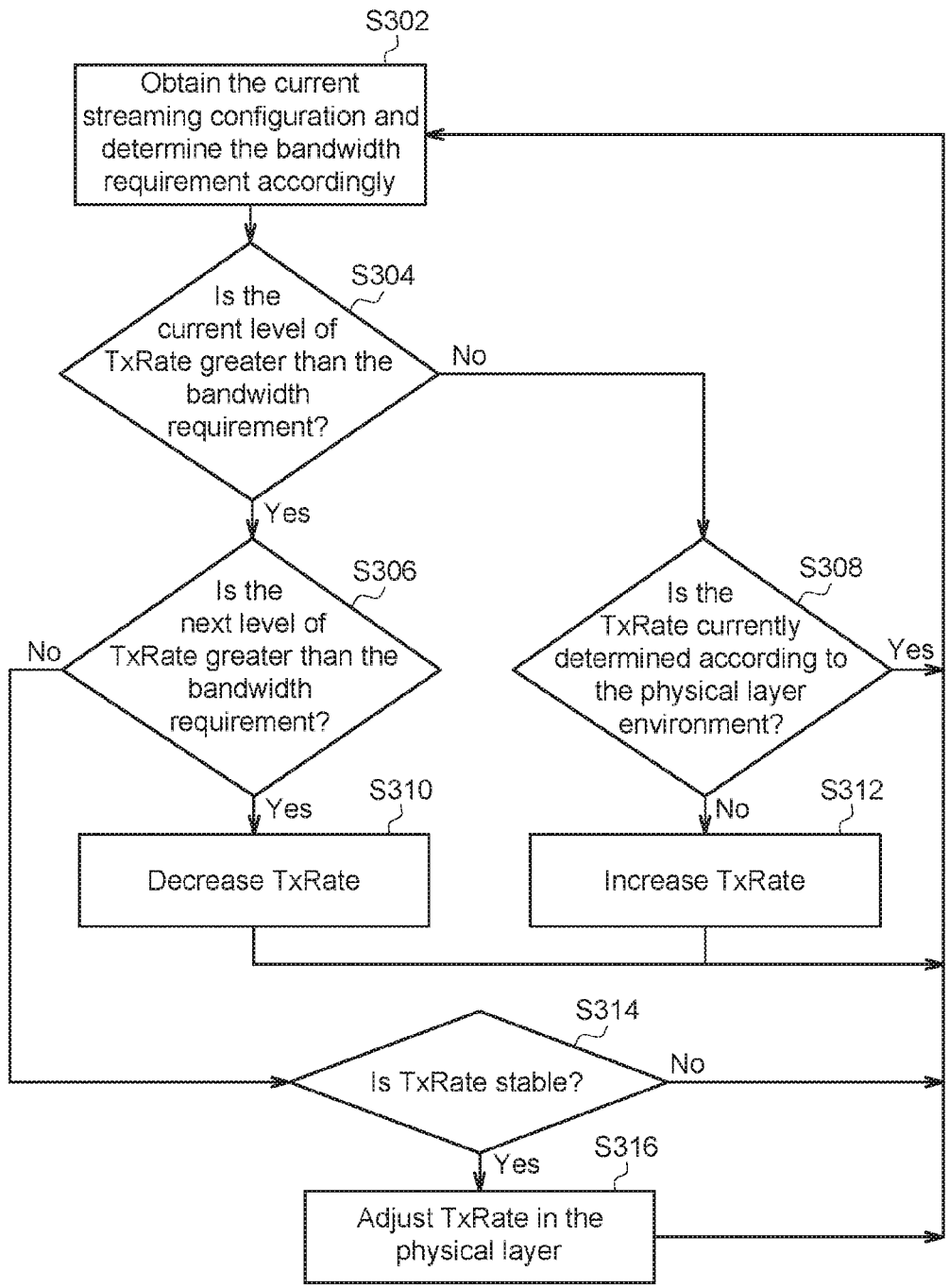
FIG. 3 shows a flowchart illustrating a method for controlling transmission rate according to an embodiment of the invention.

FIG. 3 shows a flowchart illustrating a method for controlling transmission rate according to an embodiment of the disclosure. The method in this embodiment includes the following steps. Step S302: obtain the current streaming configuration and determine the bandwidth requirement accordingly. The WLAN device 20 provides streaming service in this embodiment. As described above, the bandwidth requirement may be calculated by obtaining the current streaming configuration, such as the number of users requesting streaming service. In other embodiments, the bandwidth requirement of the WLAN device 20 in the application layer may be calculated in different ways according to other services provided by the WLAN device 20.

According to the IEEE 802.11 standard, the TxRate has multiple levels. For example, the TxRate of the 802.11a standard includes levels of: 6 Mbps, 9 Mbps, 12 Mbps, 18 Mbps, 24 Mbps, 36 Mbps, 48 Mbps, 54 Mbps. The TxRate of the 802.11n standard includes levels of: 15 Mbps, 30 Mbps, 45 Mbps, 60 Mbps, 90 Mbps, 120 Mbps, 135 Mbps, 150 Mbps. Step S304: determine whether or not the current level of the TxRate is greater than the bandwidth requirement. If the determination result of the step S304 is yes, the current TxRate may be sufficiently high for dealing with the current bandwidth requirement, and hence TxRate may be reduced (step S310). If the determination result of the step S304 is no, the current TxRate may be too low to deal with the current bandwidth requirement, and hence TxRate may be increased (step S312).

In one embodiment, if the determination result of the step S304 is yes, obtain the next level that is lower than the current level and execute step S306. The transmission rate corresponding to the next level is smaller than the transmission rate corresponding to the current level. Step S306: determine whether or not the next level of the TxRate is greater than the bandwidth requirement. If the determination result of the step S306 is yes, the next level of the TxRate is still sufficiently high for dealing with the current bandwidth requirement, and hence step S310 may be performed to reduce TxRate. For example, the bandwidth requirement calculated in the step S302 is 16 Mbps. If the current level of the TxRate is 36 Mbps (taking 802.11a standard for example), the next level lower than the current level may be 24 Mbps. In this example, the determination results of step S304 and step S306 are both yes, step S310 is performed to reduce TxRate, and hence the TxRate is set to the next level 24 Mbps.

In one embodiment, if the determination result of the step S304 is no, step S308 is performed to determine whether or not the TxRate is currently determined according to the physical layer environment. For example, the determination result of the step S308 is yes if the TxRate is determined according to the received signal strength indicator (RSSI) of the signal or the data transmission error rate. On the other hand, the determination result of the step S308 is no if the TxRate is determined according to the bandwidth requirement in the application layer (such as based on steps S302, S304, S306) regardless of the signal quality in the physical layer.

If the determination result of the step S308 is yes, it represents that the current physical layer environment limitation may only be able to bear TxRate with this large value, and it may not be possible to further increase the TxRate. For example, increasing TxRate may result in the error rate exceeding a specific threshold value. Thus the process goes back to step S302. On the other hand, if the determination result of the step S308 is no, it represents that the current TxRate may have been adjusted and decreased based on bandwidth requirement in past time. In response to the current bandwidth requirement, the TxRate may try to increase again, and thus step S312 may be performed to increase TxRate. For example, the TxRate may be set to the previous level. The transmission rate corresponding to the previous level is larger than the transmission rate corresponding to the current level.

After decreasing TxRate in step S310 (or increasing TxRate in step S312), the process goes back to the step S302 and the above described flow is repeated to dynamically adjust the TxRate continuously according to the bandwidth requirement. In one embodiment, the TxRate in the steps S304, S306, S308, S310, S312 may be a register value stored in the processing unit 220. The embodiment shown in FIG. 3 may further include step S314 to determine whether or not the TxRate register value is stable. If the TxRate register value is stable, perform step S316 to adjust TxRate in the physical layer. In other words, the actual TxRate in the physical layer is modified in the step S316, and the transmission unit 210 changes data transmission rate accordingly. This approach avoids unstable fluctuation in physical layer TxRate caused by transient instability. One example implementation for step S314 is: the TxRate is stable if the processing unit 220 determines that the TxRate register value remains the same for two consecutive execution cycles.

One example regarding the step S314 is given below. In the first execution cycle, the determination result of the step S306 is yes, TxRate register value is decreased in step S310, and the process goes back to step S302. In the second execution cycle, the determination result of the step S306 is no, proceed to step S314. The TxRate is not stable yet because the TxRate register value has just been decreased in the previous execution cycle. In the third execution cycle, the determination result of the step S306 is still no, step S314 is performed again. Because the TxRate register value remains the same for two consecutive cycles, TxRate is stable already, and then step S316 is performed to adjust TxRate in the physical layer.

Steps S302, S304, S306, S308, S310, S312, S314 in FIG. 3 may be performed by the processing unit 220 in FIG. 2. The processing unit 220 may inform the transmission unit 210 to perform the step S316. By performing steps shown in FIG. 3, the TxRate of the WLAN device 20 can be quickly set to the level most suitable for the current bandwidth requirement. The method can avoid high error rate and additional resource waste caused by TxRate having a too large value. The method also considers the current physical environment to adjust the TxRate accordingly to meet the physical layer environment limitations.

According to the method for controlling transmission rate and WLAN device using the same, the TxRate of the WLAN device can be directly determined according to the bandwidth requirement in the application layer regardless of the distance between the WLAN device and the serving client device or the server device. Not only the adjustment time is saved, but also the TxRate of the WLAN device can be kept stable. The network service provided by the WLAN device can thus be kept in normal operation. The proposed method may be applied to a WLAN device that is capable of determining the bandwidth requirement by itself, such as an IP camera or a network video recorder. The method may be implemented by writing to the drivers of the WLAN device so that the WLAN device can inform the lower network layer to adjust the data transmission rate based on the requirement of the upper network layer.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for controlling transmission rate used in a wireless local area network (WLAN) device, the method comprising:
   calculating a bandwidth requirement of the WLAN device according to a network application service provided by the WLAN device in an application layer; and
   determining a WLAN data transmission rate of the WLAN device in a physical layer according to the bandwidth requirement,
   wherein the step of determining the WLAN data transmission rate of the WLAN device in the physical layer comprises:
   increasing the WLAN data transmission rate if the WLAN data transmission rate is currently not greater than the bandwidth requirement and the WLAN data transmission rate is currently not determined according to the physical layer environment.

2. The method according to claim 1, wherein the step of determining the WLAN data transmission rate of the WLAN device in the physical layer comprises:
   decreasing the WLAN data transmission rate if the WLAN data transmission rate is currently greater than the bandwidth requirement.

3. The method according to claim 1, wherein the WLAN data transmission rate has a plurality of levels, the step of determining the WLAN data transmission rate of the WLAN device in the physical layer comprises:
   obtaining a current level of the WLAN data transmission rate;

obtaining a next level of transmission rate that is lower than the current level; and setting the WLAN data transmission rate to the next level of transmission rate if the current level is greater than the bandwidth requirement and the next level of transmission rate is greater than the bandwidth requirement.

4. The method according to claim 1, wherein the step of determining the WLAN data transmission rate of the WLAN device in the physical layer comprises:

increasing the WLAN data transmission rate if the WLAN data transmission rate is currently not greater than the bandwidth requirement.

5. The method according to claim 1, wherein the WLAN device is configured to provide a streaming service, and the step of calculating a bandwidth requirement of the WLAN device comprises:

obtaining a current streaming configuration of the streaming service, and determining the bandwidth requirement according to the current streaming configuration.

6. A wireless local area network (WLAN) device, comprising:

a transmission unit, configured to transmit WLAN data with a WLAN data transmission rate; and a processing unit, configured to calculate a bandwidth requirement of the WLAN device according to a network application service provided by the WLAN device in an application layer, and to determine the WLAN data transmission rate of the WLAN device in a physical layer according to the bandwidth requirement, wherein the processing unit is configured to increase the WLAN data transmission rate if the processing unit determines that the WLAN data transmission rate is currently not greater than the bandwidth requirement and the WLAN data transmission rate is currently not determined according to the physical layer environment.

7. The WLAN device according to claim 6, wherein the processing unit is configured to decrease the WLAN data transmission rate if the processing unit determines that the WLAN data transmission rate is currently greater than the bandwidth requirement.

8. The WLAN device according to claim 6, wherein the WLAN data transmission rate has a plurality of levels, and the processing unit is further configured to:

obtain a current level of the WLAN data transmission rate;

obtain a next level of transmission rate that is lower than the current level; and set the WLAN data transmission rate to the next level of transmission rate if the current level is greater than the bandwidth requirement and the next level of transmission rate is greater than the bandwidth requirement.

9. The WLAN device according to claim 6, wherein the processing unit is configured to increase the WLAN data transmission rate if the processing unit determines that the WLAN data transmission rate is currently not greater than the bandwidth requirement.

10. The WLAN device according to claim 6, wherein the WLAN device is configured to provide a streaming service, and the processing unit is further configured to obtain a current streaming configuration of the streaming service and to determine the bandwidth requirement according to the current streaming configuration.

* * * * *